United States Patent [19]
Watson

[11] Patent Number: 5,294,428
[45] Date of Patent: Mar. 15, 1994

[54] DOUBLE COMBUSTION OXYGEN ENHANCED SULFUR RECOVERY PROCESS

[75] Inventor: Richard W. Watson, Iikley, England

[73] Assignee: The BOC Group, plc, Surrey, England

[21] Appl. No.: 20,625

[22] Filed: Mar. 2, 1987

[30] Foreign Application Priority Data

Mar. 7, 1986 [GB] United Kingdom ............... 8605650
Jan. 30, 1987 [GB] United Kingdom ............... 8702134

[51] Int. Cl.$^5$ ..................... C01B 17/04; B01D 53/36
[52] U.S. Cl. ................................ 423/574.1; 422/172; 423/576.8
[58] Field of Search ................ 423/574 R, 576.8; 422/172

[56] References Cited

U.S. PATENT DOCUMENTS

| | | | |
|---|---|---|---|
| 2,760,848 | 8/1956 | Dunning | 423/574 R |
| 2,919,976 | 1/1960 | Feagan, Jr. | 423/574 R |
| 3,331,733 | 7/1967 | Venemarkl | 423/182 |
| 4,405,593 | 9/1983 | Schlauer et al. | 423/574 R |
| 4,552,747 | 11/1985 | Goar | 423/574 R |
| 4,780,305 | 10/1988 | Steppe | 423/574 R |

FOREIGN PATENT DOCUMENTS

| | | |
|---|---|---|
| 0142911 | 5/1985 | European Pat. Off. |
| 1963026 | 11/1970 | Fed. Rep. of Germany |
| 2387903 | 4/1978 | France |
| 1578002 | 4/1978 | United Kingdom |

OTHER PUBLICATIONS

"How A Computer Can Optimize Sulfur-Plant Design Operations", Opokar et al. Oil and Gas Journal, May 2, 1966, pp. 86–89.

*Primary Examiner*—Jeffrey E. Russel
*Attorney, Agent, or Firm*—David M. Rosenblum; Larry R. Cassett; R. Hain Swope

[57] ABSTRACT

A feed gas stream containing at least 60% by volume of hydrogen sulphide is burnt in a first combustion region to form water vapor and sulphur dioxide. Oxygen is employed to support combustion is the region. Thermal reaction then takes place in a thermal reaction region between hydrogen sulphide and sulphur dioxide to form sulphur vapor and water vapor. The resulting gas mixture is then cooled and sulphur vapor is extracted in a condenser. The gas mixture then passes into a second combustion region in which a further portion of the hydrogen sulphide is burnt in the presence of oxygen to form further sulphur dioxide and to adjust the mole ratio of hydrogen sulphide to sulphur dioxide to about 2:1. Further reaction between hydrogen sulphide and sulphur dioxide may be conducted in a further thermal reaction region and in catalytic reactors with further sulphur extraction in further condensers. The mole ratio of hydrogen sulphide to oxygen entering the first combustion region per unit time is greater than 2:1 and the mole ratio of hydrogen sulphide to fluid(s) (if any) other than oxygen being introduced into the first combustion region is greater than 3:2 and preferably greater than 4:1. By using substantially pure oxygen to support combustion of the hydrogen sulphide, a relatively large flow rate of feed gas mixture may be handled in a plant of given size.

19 Claims, 2 Drawing Sheets

DOUBLE COMBUSTION OXYGEN ENHANCED SULFUR RECOVERY PROCESS

BACKGROUND OF THE INVENTION

This invention relates to the treatment of gases. In particular, it relates to the treatment of a gas stream comprising hydrogen sulphide.

Gas streams comprising hydrogen sulphide are typically produced as waste products or by-products from many industrial processes. For example, acid gas streams comprising carbon dioxide and hydrogen sulphide are typically produced during oil refinery operations in which sulphur is removed from crude oil. It is necessary to treat such hydrogen sulphide-containing streams before discharging them to the atmosphere so as to reduce or remove altogether their content of sulphur-containing gases. One well known, widely practised process for treating a gas stream comprising hydrogen sulphide is the Claus process. This process is based on the reaction between hydrogen sulphide and sulphur dioxide to form sulphur vapour and water vapour in accordance with the equation.

$$SO_2 + 2H_2S = 2H_2O + 3S$$

Sulphur exists in the vapour phase in a number of different molecular species such as $S_2$, $S_6$ and $S_8$ according to the temperature.

The first stage of the Claus process is to burn approximately a third of the hydrogen sulphide in the incoming gas stream to form sulphur dioxide and water vapour in accordance with the equation:

$$2H_2S + 3O_2 = 2H_2O + 2SO_2$$

This combustion reaction takes place in a suitable furnace and normally air is used as the source of oxygen for the purposes of combustion. The furnace is designed such that reaction between the sulphur dioxide and hydrogen sulphide can start in the combustion zone and then continue downstream of the combustion zone. It is however a feature of the Claus reaction that at the temperature that is created by the combustion of hydrogen sulphide, it is not possible to convert more than about 75% of the remaining hydrogen sulphide to sulphur by reaction with sulphur dioxide, and typically between 50 to 70%, of the hydrogen sulphide is so converted. It is however possible to achieve a higher percentage conversion in the presence of a catalyst at a reaction temperature in the order of 200° to 350° C. by reacting the remaining hydrogen sulphide and sulphur dioxide. (At such "catalytic" temperatures, the lower the temperature the higher is the percentage conversion that is achieved). Accordingly, after the gases pass out of the so-called thermal region of the furnace they are cooled to a temperature at which the sulphur that is formed in the furnace condenses. The sulphur is thus recovered. The gases are then reheated to a temperature suitable for the performance of a catalysed reaction between hydrogen sulphide and sulphur dioxide, such temperature typically being in the order of 200° C. A catalytic reaction is then carried out and typically about 60% of the remaining hydrogen sulphide is converted to sulphur. Nonetheless, it is still not possible to achieve 100% conversion as in practice conversions of more than 99.5% can be achieved only at a temperature at which the sulphur vapour condenses and thereby substantially reduces the effectiveness of the catalyst. It is therefore typical to perform the catalytic oxidation of hydrogen sulphide with sulphur dioxide in more than one stage with first condensation of sulphur vapour and then re-heating of the hydrogen sulphide bearing gas stream being carried out between each stage. Various means may be employed to effect reheating of the gases prior to each catalytic stage. For example, a small part of the feed gas mixture can be diverted from upstream of the furnace and burnt in in-line burners completely to sulphur dioxide, there being typically one such burner upstream of each catalytic reactor. The hot, sulphur dioxide-containing gases are then mixed with the main gas stream upstream of each respective catalytic reactor so as to effect reheating. Alternatively, a part of the main gas stream can be taken from, say, a waste heat boiler used to cool the main gas stream leaving the furnace and used in the same manner as the gas from the in-line burners. Another alternative is to employ indirect heat exchange with, for example, steam to effect reheating. After two or three such stages, sulphur formed in the most downstream stage is condensed out of the gas stream which is then typically passed to a tail gas clean-up process of a known kind suitable for handling relatively dilute hydrogen sulphide streams (for example the Scot, Beavon or Stretford process), or which is then incinerated.

Many variations on this basic Claus process are possible. Some of these alterations are summarised in the paper "Sulfur Costs vary with Process Selection" by H. Fischer, Hydrocarbon Processing, March 1979, pp125 to 129.

Recently, there has been a trend towards using crude oils of relatively high sulphur contents and also a trend towards stricter environmental standards so far as the discharge to the atmosphere of sulphur-containing gases is concerned, thus requiring an increased number of hydrogen sulphide bearing streams to be treated, and hence more treatment capacity for hydrogen sulphide containing gases. For example, where possible, it is desirable to increase the rate at which a Claus plant of given size is able to produce sulphur. In practice, the ability of such plants to handle an increased throughput of hydrogen sulphide-containing gas is limited. It has been realised that in order to supply the necessary oxygen for combustion, approximately 14 volumes of air are required for each six volumes of hydrogen sulphide in the gas mixture. It has been proposed in for example a paper entitled "Oxygen Use in Claus Sulphur Plants" by M. R. Gray and W. Y. Svrcek, 1981 Gas Conditioning Conference, Oklahoma, 1981 and in a paper entitled "Modifications Jump Sulphur Recovery Plant Capacity", Oil and Gas Journal, August 20th 1984, pp108 to 112, that the capacity of existing Claus processes can be increased by substituting some commercially pure oxygen for air and thereby reducing the proportion of nitrogen in the gas mixture that flows through the process. In practice, however, in many plants, the amount of uprating that can be achieved by this method is limited as there is a tendency for the reduced volume of nitrogen to lead to higher exit temperatures from the furnace that cannot be withstood by the waste heat boiler or heat exchanger associated with the furnace or by the refractory lining of the furnace. Indeed, the more concentrated (in hydrogen sulphide) the gas stream, the less is the possibility of achieving any significant uprating, such possibility often becoming particularly limited for feed gas streams including 80% by volume or more of hydrogen sulphide.

Another proposal for using pure oxygen in the Claus process is set out in U.S. Pat. No. 3,681,024 and its corresponding Canadian patent specification 854094. These patent specifications disclose burning one third of a hydrogen sulphide stream with oxygen of about 95% purity. Plant effluent from a one or two catalytic reactor unit is sent to a water scrubber to reduce the water content of the effluent, and a sufficient amount of the scrubber off-gas is recycled to dilute the oxygen feed so that the furnace temperature is essentially equivalent to that obtained in operation with air. This process is stated to have the advantage of enabling plant size to be reduced. However, existing plants constructed with the intention of using air to support the combustion of the hydrogen sulphide are not readily convertible to perform the process described in U.S. Pat. No. 3,681,024 and this process has not found commercial favour. Moreover, the practice of recycling to the thermal reaction zone a gas mixture that has passed therethrough places a limitation on the amount by which the size of the furnace defining the thermal reaction zone can be reduced, particularly if the incoming hydrogen sulphide stream contains more than, say, 60% by volume of hydrogen sulphide. U.S. Pat. Nos. 3,331,733 and 4,552,747 are other examples of proposals in which gas is recirculated in order to moderate the temperature in the thermal reactor.

THE INVENTION

It is an aim of the present invention to provide an improved method and apparatus for recovering sulphur from a gas stream consisting of hydrogen sulphide or containing a relatively high proportion of hydrogen sulphide which is capable of minimising the volumes of "ballast" gas such as nitrogen that flow through the sulphur recovery process. and which do not of necessity rely on recycling effluent gas to the inlet of the furnace.

According to the present invention there is provided a method of recovering sulphur from a feed gas stream comprising at least 60% by volume of hydrogen sulphide, including burning less than 33 mole percent of the hydrogen sulphide content of the feed gas stream in a first combustion region to form water vapour and sulphur dioxide, introducing oxygen into the combustion region to support the combustion of the hydrogen sulphide, reacting unburnt hydrogen sulphide with said sulphur dioxide in a thermal reaction region associated with the first combustion region to form sulphur vapour and water vapour, the mole ratio of hydrogen sulphide to oxygen entering the combustion region per unit time being greater than 2:1, and the mole ratio of hydrogen sulphide to fluid(s) (if any) other than oxygen being introduced into the combustion region per unit time being greater than 3:2 (and preferably greater than 4:1), taking a resultant gas mixture comprising water vapour, sulphur dioxide, hydrogen sulphide, and sulphur vapour from said thermal reaction region, extracting the sulphur vapour from the resultant mixture, reacting in at least one catalytic region hydrogen sulphide contained in the resulting gas mixture with sulphur dioxide contained in the resultant gas mixture to form further sulphur vapour and water vapour, and extracting said further sulphur vapour from the gas mixture, wherein the mole ratio of said hydrogen sulphide to sulphur dioxide is adjusted upstream of said at least one catalytic region by burning a further portion of the hydrogen sulphide content of the resulting gas mixture in a second combustion region to bring the mole ratio to the stoichiometric value or one approximating thereto.

The invention also provides apparatus for performing the method defined in the paragraph immediately hereinabove, said apparatus comprising means for burning less than 33 mole percent of the hydrogen sulphide content of the feed gas stream in a first combustion region to form water vapour and sulphur dioxide; means for introducing oxygen into the combustion region to support the combustion of the hydrogen sulphide; a thermal reaction region, in association with the combustion region, for reacting unburnt hydrogen sulphide with said sulphur dioxide to form sulphur vapour and water vapour; first means for extracting the thus formed sulphur vapour; downstream of said extracting means at least one catalytic reaction region for reaction between hydrogen sulphide and sulphur dioxide to form further water vapour and sulphur vapour; second means for extracting said further sulphur vapour, and means for adjusting the mole ratio of said hydrogen sulphide to sulphur dioxide to bring it to the stoichiometric value or one approximating thereto, said adjusting means comprising a second combustion region in which, in use, a further portion of hydrogen sulphide is burnt wherein no gas is recycled to said first combustion region.

The second combustion region is preferably intermediate the first sulphur extraction means and said at least one catalytic reaction region.

The thermal reaction region typically has heat exchange means associated therewith for reducing the temperature of the gas mixture upstream of the first sulphur extraction means.

By burning less than 33 mole per cent of the hydrogen sulphide content of the feed gas mixture in the first combustion region, a greater proportion of hydrogen sulphide becomes available for moderating the temperature in such region and therefore there is a reduced or no need for other moderating gases in this combustion region. Thus, it becomes unnecessary to recycle to the first combustion region gas from downstream of the thermal reaction region and we strongly prefer not to perform such a recycle. Thus, typically, the only fluid other than hydrogen sulphide and oxygen to be introduced into the first combustion region is whatever fluid (if any) other than hydrogen sulphide is inherently present in the feed gas mixture. Indeed, it is possible to use in the method and apparatus according to the invention a pure source of oxygen, although less preferably oxygen-enriched air may be employed.

Some or all of the gas mixture leaving the first sulphur condenser may be passed into the second combustion region. Provided a stable flame can be maintained in the second combustion region, all the gas mixture from the first sulphur extraction means is preferably passed into the second combustion region. Preferably, pure oxygen is used to support combustion in the second combustion region. Such use of pure oxygen helps to maximise the flame temperature in the second combustion region, although it is possible to use oxygen-enriched air in the second combustion region instead of pure oxygen to support the combustion of the hydrogen sulphide. However, if difficulties would be likely to arise in maintaining such a stable flame, some of the gas mixture leaving the first sulphur extraction means may by-pass the second combustion region.

It is also possible to arrange for some of the gas mixture upstream of the first combustion region to by-pass the first combustion region.

There is preferably a second thermal reaction region downstream of the second combustion region. Reaction between hydrogen sulphide and sulphur dioxide takes place in the second thermal reaction region to form water vapour and sulphur vapour. The gas mixture leaving the second thermal reaction region may typically be cooled and then its sulphur vapour extracted in another sulphur extraction means.

In examples of the invention in which there is some by-passing of the first or second combustion region the by-passed gas mixture may be united upstream, in or downstream of the second thermal reaction region with that which leaves the second combustion region. Preferably in such examples, depending on the mole fraction of hydrogen sulphide in the feed gas mixture, only a relatively small proportion of the gas mixture is by-passed downstream of the first sulphur extraction means.

When, however, the concentration of hydrogen sulphide falls to about, say, 60 to 65% volume of hydrogen sulphide, then there may be no need for a second thermal reaction region or in some of these examples for a waste heat boiler (or like means) downstream of the second combustion region.

Moreover, in some examples of the invention, particularly if the feed gas mixture is relatively dilute in hydrogen sulphide, it may be desirable to by-pass a relatively large proportion of the gas mixture.

Typically, the proportion of the hydrogen sulphide in the feed gas mixture that is burnt in the first combustion region is chosen so as to give a flame temperature of at least 1300° C. Since the extent of thermal reaction between hydrogen sulphide and sulphur dioxide increases with increasing temperature, the temperature in the first combustion region and its associated thermal reaction region is preferably arranged to be the maximum that does not tend to cause damage to the apparatus according to the invention.

Typically up to 25 mole per cent of the feed gas mixture is burnt in the first combustion region. In one example of the method according to the invention, employing a feed gas stream comprising 90 mole per cent hydrogen sulphide and 10 mole per cent carbon dioxide, some 15 to 20 mole per cent of the hydrogen sulphide is burnt to form sulphur dioxide and water vapour in the first combustion region using pure oxygen to support combustion. We calculate that the temperature of the gas mixture leaving the thermal reaction zone associated with the first combustion region thus created is less than 1425° C., and it will typically be possible to use a conventional heat exchanger for cooling the gas mixture leaving the thermal reaction region prior to extraction of the sulphur vapour (for example by condensation of the vapour and separation of the condensate from the non- condensed gas). Downstream of such extraction of the sulphur vapour sufficient oxygen may be supplied to the second combustion region to burn sufficient hydrogen sulphide to adjust the mole ratio of hydrogen sulphide to sulphur dioxide to the stoichiometric value of about 2:1.

The first combustion region and the first thermal reaction region are typically provided in a first furnace or reactor, and in some examples of the invention the second combustion region and a associated thermal region are provided in a second furnace or reactor.

Since the method according to the invention can be operated with a substantially lower proportion of gases other than hydrogen sulphide and oxygen entering the first furnace or reactor, this furnace or reactor may be substantially smaller than that employed in a conventional Claus sulphur recovery process. Moreover, in examples of the invention which do not employ said by-passing and which effect the combustion of hydrogen sulphide in two separate combustion regions, with thermal reactions between hydrogen sulphide and sulphur dioxide being conducted downstream of each region, it is possible to obtain a higher degree of conversion of hydrogen sulphide to sulphur than is obtained in the one combustion-cum-thermal reaction region of a conventional plant for performing Claus process. A reduction in the duty to be performed by a subsequent catalytic reaction region or regions is thus made possible for a given overall degree of conversion of hydrogen sulphide to sulphur. Since, in general, the pressure drop associated with a given degree of catalytic reaction between hydrogen sulphide and sulphur dioxide is greater than that associated with the same degree of thermal or non-catalytic reaction, design of a plant for performing the method according to the invention so as to maximise the throughput of hydrogen sulphide is facilitated.

In preferred examples of the method according to the present invention, a gas mixture leaving the thermal reaction region associated with the second combustion region is preferably cooled to a temperature in the range 300° to 400° C. and then subjected to reaction over a catalyst whereby, first, some of the residual hydrogen sulphide reacts with sulphur dioxide to form further sulphur vapour and water vapour, and, secondly, any carbon oxysulphide and carbon disulphide present as trace impurities in the gas mixture are hydrolysed. These reactions may be performed with or without there being any intermediate extraction of sulphur vapour in the gas mixture leaving the thermal reaction region associated with the second combustion region. In the event that such sulphur extraction is performed, the gas mixture is preferably reheated upstream of the subsequent catalytic reaction region.

Preferably, sulphur vapour is extracted from the gas mixture leaving the catalytic reaction region in a condenser in which the sulphur vapour condenses and the resulting condensate is separated from the gas mixture. Preferably, at least one further catalytic stage of reaction between hydrogen sulphide and sulphur dioxide is performed, more catalyst being used in this stage than in the first catalytic reactor.

BRIEF DESCRIPTION OF THE DRAWINGS

The method and apparatus according to the present invention will now be described by way of example with reference to the accompanying drawings of which.

DETAILED DESCRIPTION OF THE INVENTION

Figure 1:
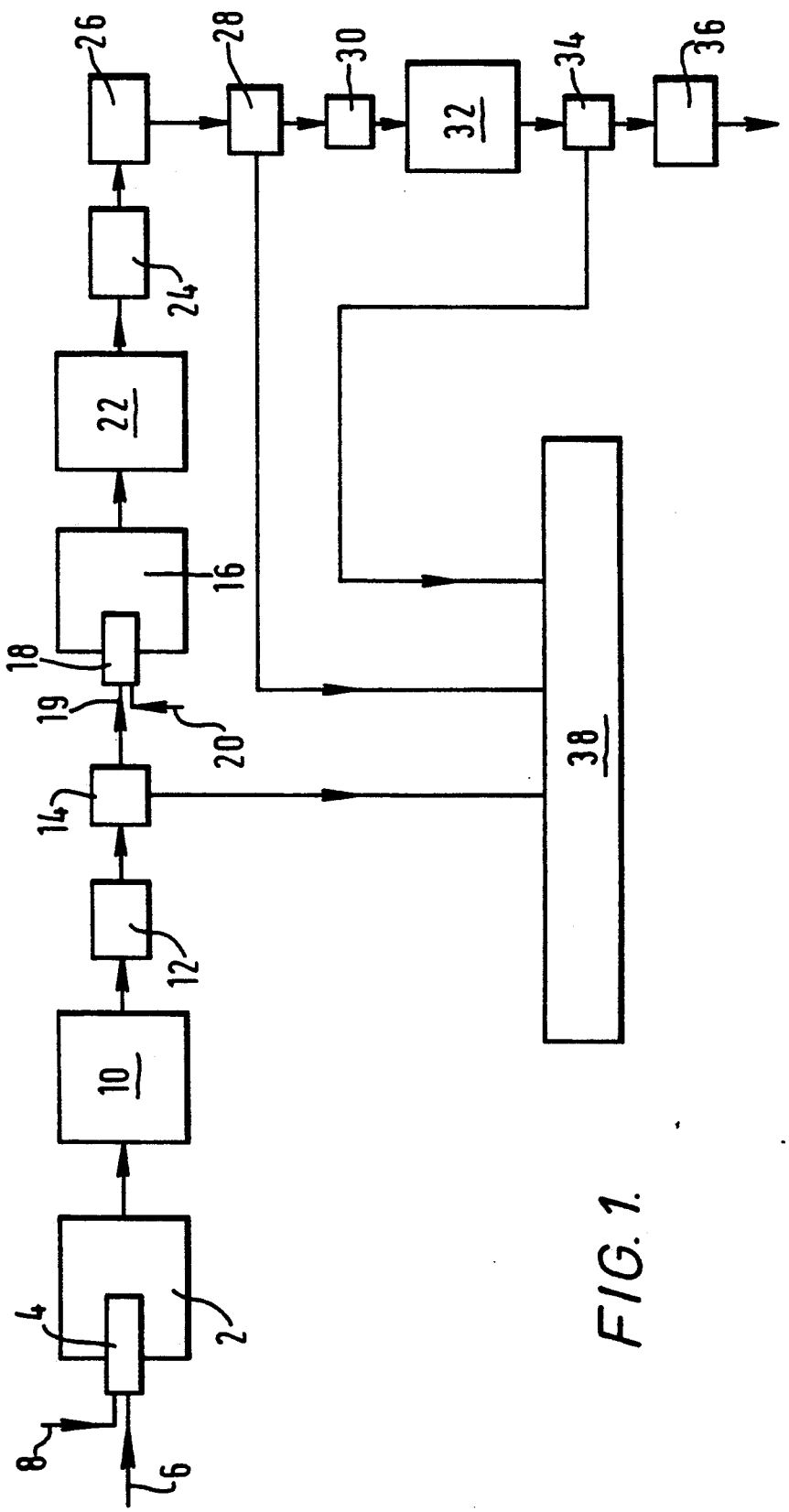
FIG. 1 is a schematic diagram illustrating a plant for extracting sulphur from a hydrogen sulphide containing gas mixtures and FIG. 2 is a schematic diagram illustrating an alternative plant for extracting sulphur.

Referring to FIG. 1 of the accompanying drawings, a first combustion region 2 is provided with a burner 4 for burning hydrogen sulphide. The burner 4 has an inlet 6 for a stream of hydrogen sulphide rich gas mixture (typically containing at least 80% by volume of hydrogen sulphide) and an inlet 8 for a stream of substantially pure oxygen. All the oxygen supplied to the burner 4 is employed to support combustion of hydrogen sulphide. Sulphur dioxide and water vapour are formed as a result of this combustion. Reaction between the thus formed sulphur dioxide and hydrogen sulphide takes place in a first thermal reaction region 10 to form water vapour and sulphur vapour. No catalyst is employed in the region 10. The gas mixture leaving the thermal reaction region 10 enters the waste heat boiler (or heat exchanger) 12 in which it is reduced in temperature, typically leaving the waste heat boiler or heat exchanger 12 at a temperature in the region of 275° to 325° C. The combustion region 2 and thermal reaction region 10 are preferably defined in a single furnace (not shown) which is provided with the waste heat boiler 12 at its exit.

In the method according to the present invention, the relative rates of supply of hydrogen sulphide-rich gas stream and the oxygen stream may be set so as to give at the exit of the thermal reaction region 10 a temperature in the order of 1420° C. which is typically the optimum for the process. In conventional Claus furnaces it is desired that one-third of the incoming hydrogen sulphide is converted to sulphur dioxide, so that the sulphur dioxide thus formed may subsequently react stoichiometrically with the residual hydrogen sulphide to form sulphur vapour and water vapour with there being only a minimum of unreacted hydrogen sulphide and sulphur dioxide left over. In a conventional Claus furnace, air is used to support combustion, and there is thus generally little risk of exceeding at the exit of the thermal reaction region a flame temperature of about 1400° C. in achieving combustion of the stoichiometric amount of the hydrogen sulphide. In the method according to the invention, however, combustion in the region 2 of one third of the hydrogen sulphide in the stream 6 would inevitably have the result of producing an unacceptably high flame temperature and/or an unacceptably high temperature at the inlet to the waste heat boiler 12. Accordingly, appreciably less than a third of the incoming hydrogen sulphide is burnt in the combustion region 2. In the method according to the invention, therefore, the proportion of hydrogen sulphide entering the combustion region 2 for the inlet 6 that is oxidised to sulphur dioxide is determined by the proportion of other fluids that enter the combustion region 2 in addition to the hydrogen sulphide and the oxygen. The greater the proportion of other fluids entering the region 2, the nearer is the approach to the achievement of the combustion of the stoichiometric proportion (i.e. one-third) of the hydrogen sulphide in the combustion region 2. However, we prefer deliberately to keep the proportion of hydrogen sulphide that burns in the combustion region 2 well below one-third by keeping the amount of diluent gases such as carbon dioxide, nitrogen, water vapour and noble gases to a minimum. Accordingly, no gases are recycled from the waste heat boiler 12 or a subsequent condenser (to be described below) to the combustion region 2. Furthermore, although it is possible to employ oxygen containing up to say 20% by volume of impurities in the process according to the invention (e.g. oxygen-enriched air having a content of at least 80% by volume of oxygen) we prefer the oxygen that enters the combustion region 2 through the inlet 8 to be substantially pure. Accordingly, the only diluents are preferably those that are inherently part of the stream of hydrogen sulphide containing gas that enters the combustion region 2 through the burner inlet 6. Typically, but not necessarily, at least the greater part of such diluent comprises carbon dioxide. The method according to the invention may thus be used to recover sulphur from feed gas streams comprising at least 60% by volume of hydrogen sulphide and preferably at least 80% by volume of hydrogen sulphide, with a ratio of hydrogen sulphide entering the combustion region 2 to gases other than oxygen or hydrogen sulphide entering such region of at least 4:1.

After leaving the waste heat boiler 12, the gas stream comprising hydrogen sulphide and sulphur dioxide, water vapour and sulphur vapour is passed through a sulphur condenser 14 in which it is cooled to a temperature of about 140° C. so as to condense the sulphur vapour. The resulting condensate is passed to a sulphur seal pit 38. The residual gas mixture then passes to the inlet 19 of a burner 18 located in a second combustion region 16. The burner 18 has an inlet 20 for oxygen-containing gas, preferably substantially pure oxygen. Sufficient of the hydrogen sulphide entering the burner 18 through the inlet 19 burns to form sulphur dioxide to reduce the ratio of hydrogen sulphide to sulphur dioxide in the gas mixture to approximately 2:1. The gas mixture then passes into a thermal reaction region 22 in which reaction between hydrogen sulphide and sulphur dioxide takes place to form sulphur vapour and water vapour. The gas mixture is then cooled to a temperature in the range 300° to 400° C. in a waste heat boiler 24. The second combustion region 16 and the second thermal reaction region 22 are preferably defined in a single furnace (not shown) which has the waste heat boiler 24 at its exit.

After its passage through the waste heat boiler 24, the gas mixture passes over a relatively small bed 26 of catalyst of a kind conventionally used in the Claus process, though, if desired sulphur may be condensed out of the gas mixture in a condenser (not shown) and the gas mixture reheated in a heat exchanger (not shown) intermediate the waste heat boiler 24 and the bed 26. As a result of the passage of the gas mixture over the catalyst bed 26, sulphur dioxide reacts with hydrogen sulphide. Further sulphur vapour is thus formed (as well as water vapour). In addition, in the event that the residual gases contain any carbon disulphide or carbon oxysulphide, most or substantially all of these compounds will be hydrolysed at the prevailing exit temperature of 350°to 400° C. Since the catalytic reaction between hydrogen sulphide and sulphur dioxide is exothermic at these temperatures, the gas mixture leaves the catalytic reactor 26 at a higher temperature than it enters such reactor. The gas mixture is then passed through a condenser 28 in which it is cooled to a temperature of 140° C. so as to condense the sulphur vapour it contains, the condensate being passed to the sulphur seal pit 38. The gas mixture leaving the condenser 28 is free of sulphur vapour and is reheated in heat exchanger 30 to a temperature in the range 200° to 250° C. In the reactor 32 a further portion of hydrogen sulphide and a further portion of sulphur dioxide react with one another to form sulphur vapour and water vapour. The resulting gas mixture passes into a condenser 34 in which sulphur is condensed and then passed to the sulphur seal pit 38, while the remainder of the gas mixture, now free of sulphur vapour, typically passes to a tail gas clean-up unit 36 with, if desired, a further sequence (not shown)

of reheating catalytic reaction between hydrogen sulphide and sulphur dioxide, and sulphur extraction upstream of the unit 36.

The tail gas clean-up unit may be of the conventional kind being selected from, for example plants for performing, the Scot and Beavon processes.

Typically, the combustion region 2 is operated at a pressure a little above atmospheric pressure. For example, the pressure in the furnace in which the combustion region 2 is defined may be in the range 1.5 to 2 atmospheres absolute.

In illustrative example of the process according to the invention the feed gas mixture comprises 90% by volume of hydrogen sulphide and 10% by volume of carbon dioxide. For each 100 moles of this gas mixture, 22.5 moles of oxygen are employed in the combustion region 2 to oxidise hydrogen sulphide to sulphur dioxide, thus forming 15 moles of sulphur dioxide and 15 moles of water vapour at a thermal zone exit temperature in the order of 1425° C. In addition, small amount of hydrogen, carbon monoxide and carbon oxysulphide are formed as a result of side reactions. About 70 mole per cent of the sulphur dioxide reacts with hydrogen sulphide such that after condensation of sulphur vapour in the condenser 14 the residual gas mixture comprises approximately 32 per cent by volume of water vapour, 51 mole per cent of hydrogen sulphide, 9 mole per cent of carbon dioxide, 4 mole per cent of sulphur dioxide, and 3 mole per cent of hydrogen, 0.6 mole per cent of carbon monoxide and 0.4 mole per cent of carbon oxysulphide. Sufficient hydrogen sulphide is then combusted in the second combustion region to reduce the mole ratio of hydrogen sulphide to sulphur dioxide to 2:1 exactly. About 67 mole per cent of the remaining hydrogen sulphide is then converted to sulphur by reaction with the sulphur dioxide. After condensation of the sulphur vapour, the gas mixture comprises, by volume, 69.8% water vapour, 11.6% hydrogen sulphide, 8.8% carbon dioxide, 6.0% sulphur dioxide, 0.6% carbon monoxide, and 0.4% carbon oxysulphide. A further recovery of sulphur from the residual hydrogen sulphide and sulphur dioxide is achieved in one or more (preferably two) catalytic stages.

Figure 2:
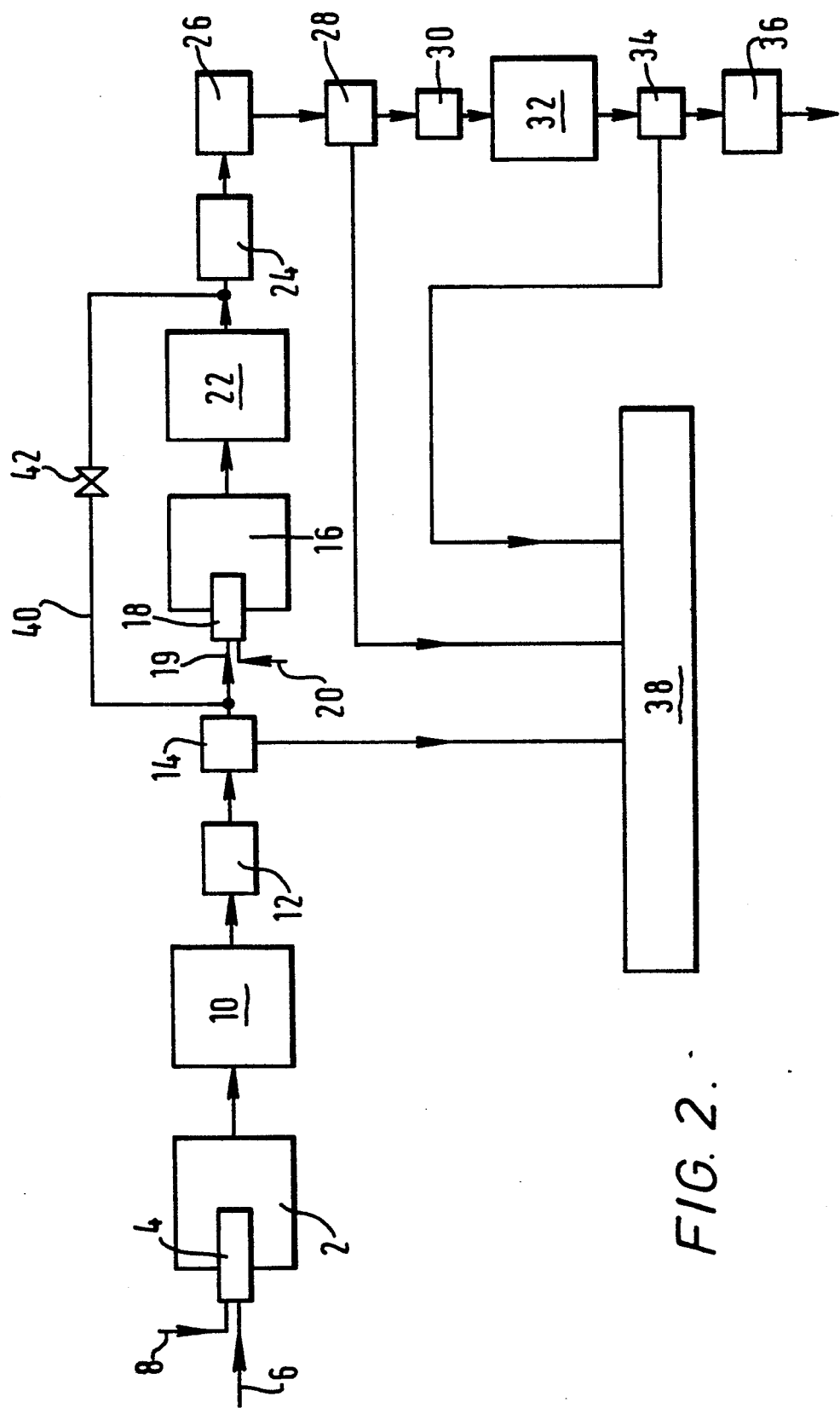

Referring now to FIG. 2 of the accompanying drawings, the plant shown is generally the same as shown in FIG. 1 except that there is a valved by-pass line 40 extending from a region intermediate the sulphur condenser 14 and the inlet 19 to the burner 18 to a region intermediate the thermal reaction region 22 and the waste heat boiler 24. Typically, from 60 to 80 per cent of the gas mixture leaving the sulphur condenser 14 is by-passed through the line 40 in the event that the feed gas mixture contains 70% by volume of hydrogen sulphide. If desired, the setting of valve 42 in the line conduit 40 may be temperature controlled so as to maintain a chosen temperature in the second combustion region. In an alternative-embodiment of the invention (not shown in the drawings) the valved by-pass line terminates in the thermal reaction region 22.

I claim:

1. A method of recovering sulphur from a feed gas stream comprising at least 60% by volume of hydrogen sulphide, including burning less than 33 mole percent of the hydrogen sulphide content of the feed gas stream in a first combustion region to form water vapour and sulphur dioxide, introducing oxygen into the combustion region to support the combustion of the hydrogen sulphide, reacting unburnt hydrogen sulphide with said sulphur dioxide in the thermal reaction region associated with the first combustion region to form sulphur vapour and water vapour, the mole ratio of hydrogen sulphide to oxygen entering the combustion region per unit time being greater than 2:1, and the mole ratio of hydrogen sulphide to fluids, if any, other than oxygen being introduced into the combustion region per unit time being greater than 3:2, taking a resultant gas mixture comprising water vapour, sulphur dioxide, hydrogen sulphide, and sulphur vapour, from said thermal reaction region, extracting the sulphur vapour from the resultant mixture, reacting in at least one catalytic region hydrogen sulphide contained in the resulting gas mixture with sulphur dioxide contained in the resultant gas mixture to form further sulphur vapour and water vapour, and extracting said further sulphur vapour from the gas mixture, wherein the mole ratio of said hydrogen sulphide to sulphur dioxide is adjusted upstream of said at least one catalytic region by burning a further portion of the hydrogen sulphide content of the resulting gas mixture in a second combustion region to bring the mole ratio to the stoichiometric value or one approximating thereto, wherein there is never gas recycle to said first combustion region from downstream of said thermal reaction region.

2. A method as claimed in claim 1, in which said mole ratio of hydrogen sulphide to fluid, if any, other than oxygen being introduced into the combustion region per unit time is greater than 4:1.

3. A method as claimed in claim 1, in which the oxygen used to support combustion in the first combustion region is pure.

4. A method as claimed in claim 3, in which the only fluid other than hydrogen sulphide and oxygen introduced into the first combustion region is whatever fluid, if any, other than hydrogen sulphide is originally present in the feed gas mixture.

5. A method as claimed in claim 1, in which the proportion of the hydrogen sulphide in the feed gas mixture that is burnt in the first combustion region is chosen to give a flame temperature of at least 1300° C. in said first combustion region.

6. A method as claimed in claim 1, in which up to 25 mole per cent of the hydrogen sulphide content of the feed gas stream is burnt in the first combustion region.

7. A method as claimed in claim 1, in which the second combustion region is intermediate the location where sulphur vapour is extracted from said resultant gas mixture and said at least one catalytic region.

8. A method as claimed in claim 1, in which pure oxygen is used to support combustion in the second combustion region.

9. A method as claimed in claim 1, in which reaction takes place between hydrogen sulphide and sulphur dioxide in a second thermal reaction region downstream of the second combustion region to form water vapour and sulpur vapour, the gas mixture leaving the second thermal region is cooled, and its sulphur vapour is extracted.

10. A method as claimed in claim 9, in which the gas mixture leaving the second thermal reaction region is cooled to a temperature in the range of 300° C. to 400° C. and is then subjected to reaction over a catalyst whereby some of the residual hydrogen sulphide reacts with sulphur dioxide to form further sulphur vapour and water vapour, there being no means for extracting sulphur vapour intermediate said second thermal region and the catalyst.

11. A method as claimed in claim 9, in which all of the gas mixture leaving the location where sulphur vapour is extracted from said resultant mixture is subsequently passed through the second combustion region.

12. A method as claimed in claim 9, in which some of the gas mixture leaving the location where sulphur vapour is extracted from said resultant mixture by-passes the second combustion region.

13. A method as claimed in claim 12, in which the by-passed gas mixture is united upstream, in, or downstream of the second thermal reaction region with the gas that leaves the second combustion region.

14. A method as claimed in claim 1, in which the feed gas mixture contains at least 70% by volume of hydrogen sulphide.

15. A method as claimed in claim 1, in which there is a plurality of catalytic reaction regions.

16. Apparatus for recovering sulphur from a feed gas stream comprising hydrogen sulphide, comprising means for burning less than 33 mole percent of the hydrogen sulphide content of the feed gas stream in a first combustion region to form water vapour and sulphur dioxide; means for introducing oxygen into the combustion region to support the combustion of the hydrogen sulphide; a thermal reaction region, in association with the combustion region, for reacting unburnt hydrogen sulphide with said sulphur dioxide to form sulphur vapour and water vapour; first means for extracting the thus formed sulphur vapour; downstream of said extracting means at least one catalytic reaction region for reaction between hydrogen sulphide and sulphur dioxide to form further water vapour and sulphur vapour; second means for extracting said further sulphur vapour, and means for adjusting the mole ratio of said hydrogen sulphide to sulphur dioxide to bring it to the stoichiometric value or one approximating thereto, said adjusting means comprising a second combustion region upstream of said at least one catalytic region and additionally including a by-pass conduit having an inlet communicating with the outlet for gas of the first sulphur extraction means, and an outlet terminating downstream of the second combustion region and upstream of, in, or downstream of the second thermal reaction region, and wherein there is no means for recycling gas to said first combustion region from downstream of said thermal reaction region.

17. Apparatus as claimed in claim 16, wherein the thermal reaction region has heat exchange means associated therewith for reducing the temperature of the gas mixture upstream of the first sulphur extraction means.

18. Apparatus as claimed in claim 16, in which the second combustion region is intermediate the first sulphur extraction means and said at least one catalytic reaction region, and additionally including a second thermal reaction region associated with the second combustion region.

19. In a process for the production of sulfur by reaction of hydrogen sulfide and sulfur dioxide wherein a feed of hydrogen sulfide is oxidized in part to sulfur dioxide to form reactants which yield sulfur by the modified catalytic Claus reaction, the improvement which comprises:
(a) introducing to a first combustion zone at least a portion of hydrogen sulfide rich gas stream containing at least about 10% by volume hydrogen sulfide and a first oxygen rich gas containing at least about 30% by volume oxygen in a proportion to achieve by combustion a first sulfur dioxide containing product gas stream at a combustion flame temperature of from about 1000° F. to about 3600° F.;
(b) cooling the first product gas stream to a temperature from about 240° F. to about 3000°; and
(c) introducing the cooled first product gas stream to at least a second combustion zone with additional oxygen rich gas stream containing at least about 30% by volume oxygen to combust additional hydrogen sulfide and yield a second sulfur dioxide containing product gas stream at a combustion flame temperature of from about 1000° F. to about 3600° F., the amount of hydrogen sulfide and oxygen fed to the combustion zones being proportioned to provide on completion of combustion a gas stream having a mole ratio of hydrogen sulfide to sulfur dioxide of about 2:1 for feed to a catalytic Claus convertor to achieve formation of sulfur by reaction of residual hydrogen sulfide with sulfur dioxide formed during combustion in the combustion zones.

* * * * *